United States Patent
Noheji et al.

(10) Patent No.: US 8,351,800 B2
(45) Date of Patent: Jan. 8, 2013

(54) OPTICAL RECEIVER AND CLOCK GENERATION METHOD

(75) Inventors: Kiyotoshi Noheji, Kawasaki (JP); Noriaki Mizuguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 168 days.

(21) Appl. No.: 13/033,994

(22) Filed: Feb. 24, 2011

(65) Prior Publication Data

US 2011/0211847 A1 Sep. 1, 2011

(30) Foreign Application Priority Data

Mar. 1, 2010 (JP) .................................. 2010-44376

(51) Int. Cl.
*H04B 10/06* (2006.01)
(52) U.S. Cl. ....................................................... 398/202
(58) Field of Classification Search .................... 398/202
See application file for complete search history.

(56) References Cited

U.S. PATENT DOCUMENTS 7,627,252 B2 * 12/2009 Sun et al. ...................... 398/155
7,689,126 B2 * 3/2010 Nemoto ............................ 398/81
2011/0229153 A1 * 9/2011 Sekine ............................ 398/208

FOREIGN PATENT DOCUMENTS

JP 2007-306371 11/2007

* cited by examiner

*Primary Examiner* — Kenneth N Vanderpuye
*Assistant Examiner* — Jamil Ahmed
(74) *Attorney, Agent, or Firm* — Fujitsu Patent Center

(57) ABSTRACT

An optical receiver includes a dispersion mitigator configured to mitigate a wavelength dispersion value in an optical signal by using a set dispersion value, a phase difference signal generator configured to generate a phase difference signal by calculating the phase difference between a first clock signal included in an optical signal mitigated by the dispersion mitigator, and a second clock signal, a dispersion value adjuster configured to adjust the set dispersion value set in the mitigator, a controller configured to control fluctuations appearing in a phase difference signal generated by the phase difference signal generator when the dispersion value is adjusted by the dispersion value adjuster, and a clock generator configured to generate the second clock follow up the phase of the first clock, being based on the phase difference signal controlled by the controller.

5 Claims, 16 Drawing Sheets

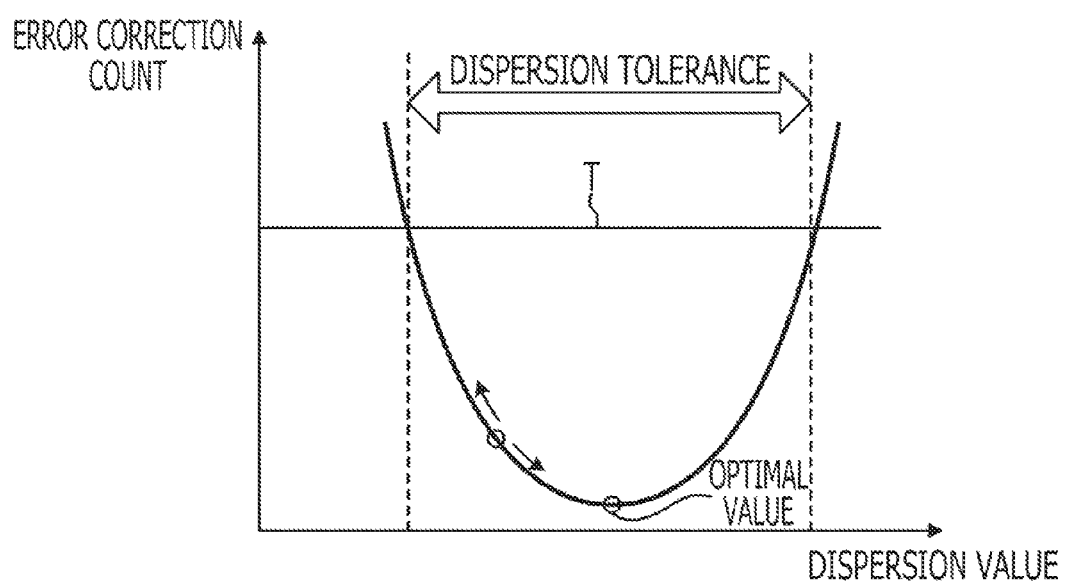

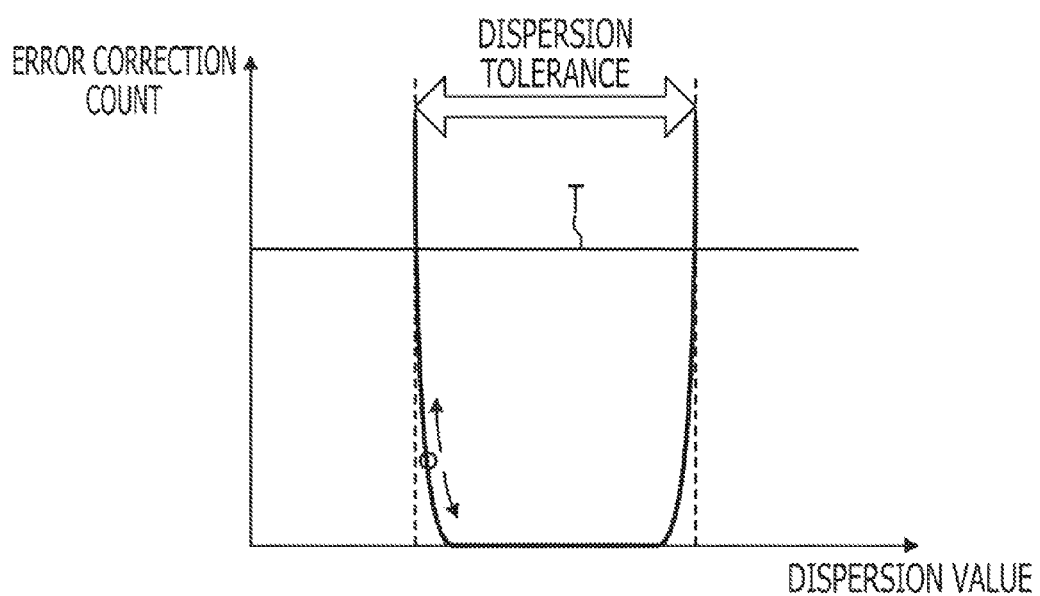

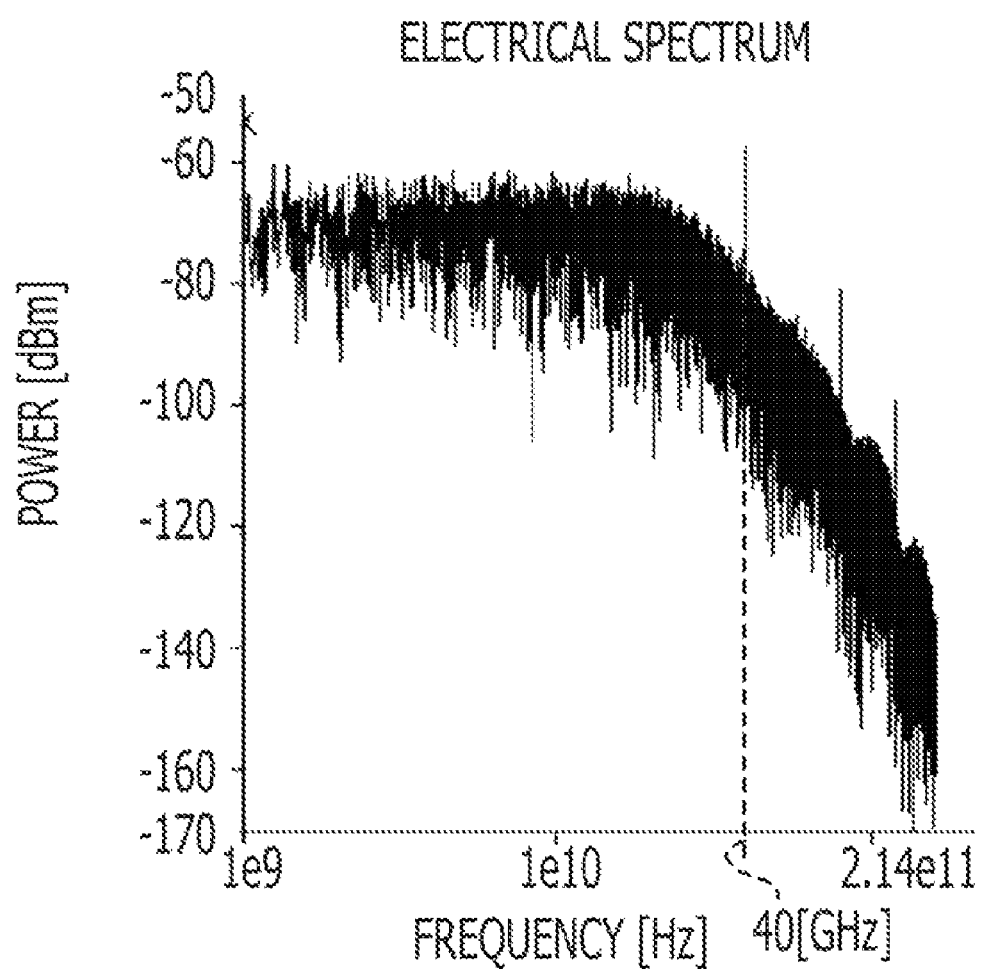

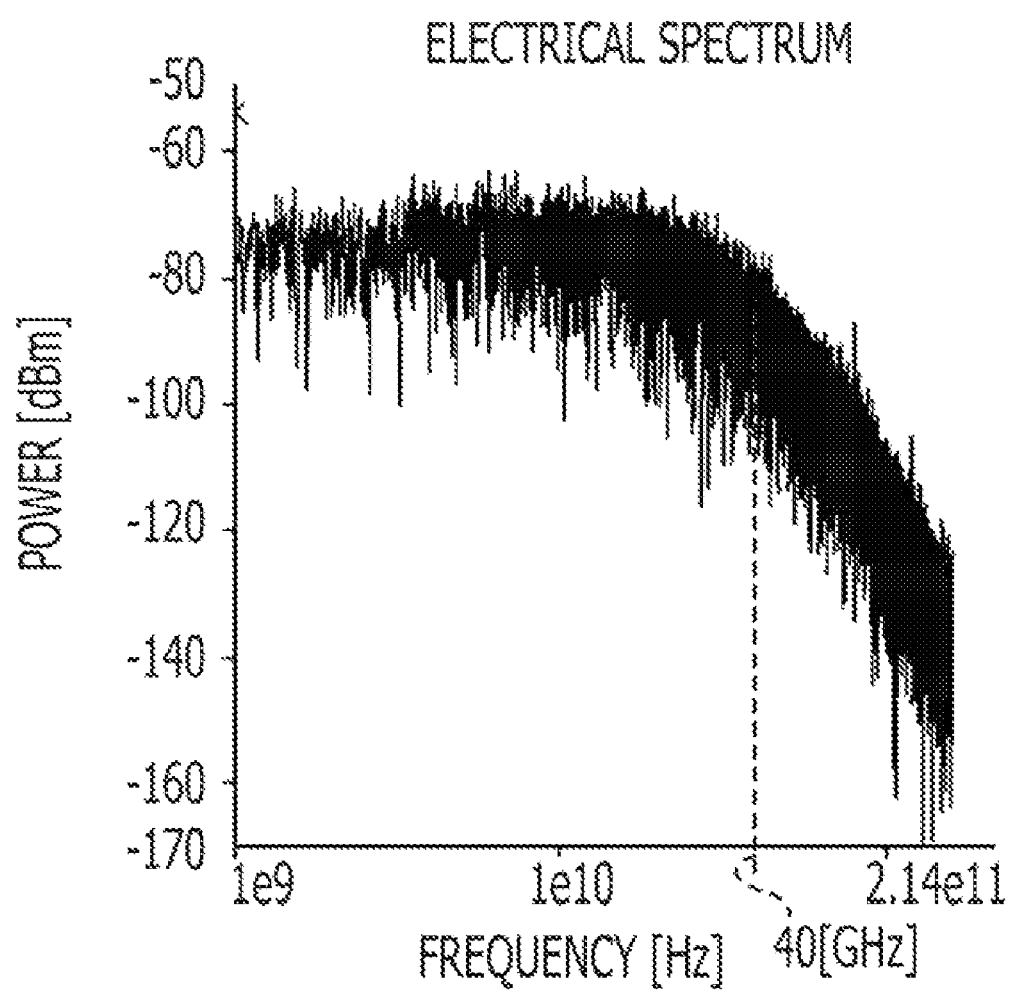

OPTICAL RECEIVER AND CLOCK GENERATION METHOD

CROSS-REFERENCE TO RELATED APPLICATIONS

This application is based upon and claims the benefit of priority of the prior Japanese Patent Application No. 2010-44376, filed on Mar. 1, 2010, the entire contents of which are incorporated herein by reference.

FIELD

The embodiments discussed herein are related to an optical receiver and a clock generation method.

BACKGROUND

In the field of optical transmission, 40 Gbps lines have recently begun to be introduced as further increases are made in network speed and bandwidth. When receiving an optical signal, waveform distortion of the optical signal increases in magnitude, due to the dispersion characteristics of the fiber cable or other optical transmission line. The influence of this waveform distortion on optical transmission increases more or less proportionally with the square of the transmission speed. For this reason, technology for mitigating a wavelength dispersion value becomes more and more important as the transmission speed of the optical signal increases.

FIG. 12 illustrates an optical receiver in accordance with the related art, wherein technology for mitigating a wavelength dispersion value has been adopted. As illustrated in FIG. 12, the optical receiver 10 of the related art includes an optical amplifier 11, a variable dispersion mitigator (VDM) 12, a delay interferometer 13, a light detector 14, an amplifier 15, and a Serializer/Deserializer (SerDes) 16. In addition, the optical receiver 10 of the related art includes a framer 17, a VDM controller 18, and a clock recovery unit (CR) 19.

In the optical receiver 10 in accordance with the related art, the optical amplifier 11 amplifies an optical signal input from an optical transmission line. The VDM 12 mitigates a wavelength dispersion value in the amplified optical signal. The delay interferometer 13 demodulates the mitigated optical signal. Subsequently, the light detector 14 converts the demodulated optical signal into an electrical signal. The amplifier 15 amplifies the converted electrical signal. The CR 19 generates a clock synchronized with the phase of the clock contained in the input electrical signal. The SerDes 16 then identifies the electrical signal as being 0 or 1 data, based on the clock generated by the CR 19 (hereinafter referred to as the internal clock), and outputs an incoming data signal expressing the identification results to the framer 17.

Based on the internal clock from the CR 19, the framer 17 corrects errors in the incoming data signal from the SerDes 16, and outputs the corrected incoming data signal to an external apparatus. In addition, the framer 17 detects an error correction count, which expresses the number of errors that were corrected in the incoming data signal from the SerDes 16. The detected error correction count is output to the VDM controller 18.

The VDM controller 18 sets an optimal dispersion value by adjusting the dispersion value set in the VDM 12 so as to minimize the error correction count detected by the framer 17. FIG. 13 illustrates the relationship between the dispersion value and the error correction count. As illustrated in FIG. 13, the error correction count increases as the dispersion value moves farther away from the optimal value. If the error correction count exceeds a threshold value T corresponding to the dispersion tolerance, then communication will be impaired. The VDM controller 18 positively or negatively adjusts the dispersion value in the VDM 12 so as to minimize the error correction count.

Meanwhile, the relationship between the dispersion value and the error correction count changes in cases where the quality of the transmitted optical signal is favorable and where the optical signal-to-noise ratio (OSNR) is favorable. FIG. 14 illustrates the relationship between the dispersion value and the error correction count in the case where the OSNR is favorable. As illustrated in FIG. 14, when the OSNR is favorable, the rate of increase in the error correction count in response to changes in the dispersion value becomes greater than usual near the dispersion tolerance. Consequently, in the vicinity of the dispersion tolerance, the error correction count might increase drastically as a result of the VDM controller 18 making a slight adjustment to the dispersion value in the VDM 12. If the error correction count increases drastically, the CR 19 will enter what is referred to as the unlocked state. The unlocked state refers to the state wherein the output signal of the CR 19 is not synchronized with the phase (or the frequency) of the input signal.

The reason why such an unlocked state occurs will now be explained using FIGS. 15 and 16. FIG. 15 illustrates one example of an electrical signal input into the CR 19 before adjusting the dispersion value. In FIG. 15, the vertical axis represents the electrical signal power, while the horizontal axis represents the electrical signal frequency. As illustrated in FIG. 15, the electrical signal input into the CR 19 contains a clock component of a given frequency. For example, the electrical signal in FIG. 15 contains a clock component at a frequency of 40 GHz.

Now assume that the VDM controller 18 adjusts the dispersion value in the VDM 12 near the dispersion tolerance. In so doing, the error correction count will increase drastically. FIG. 16 illustrates one example of an electrical signal input into the CR 19 after adjusting the dispersion value. As illustrated in FIG. 16, once the dispersion value is adjusted, the clock component contained in the electrical signal input into the CR 19 momentarily attenuates. In the example illustrated in FIG. 16, the clock component at a frequency of 40 GHz momentarily attenuates. As a result of such attenuation of the clock component, the input signal into the voltage-controlled oscillator (VCO) inside the CR 19 momentarily fluctuates, and the VCO stops correctly generating the internal clock. For this reason, the CR 19 enters an unlocked state.

At this point, the unlocked CR 19 cannot supply an accurate internal clock to other components such as the SerDes 16 and the framer 17. As a result, the dispersion value in the VDM 12 settles at the dispersion tolerance, and communication might be impaired regardless of whether or not the error correction count is less than or equal to the threshold value T.

For this reason, various technologies for avoiding the unlocked state when adjusting the dispersion value have been proposed recently. For example, in one technique, another threshold value U that is smaller than the threshold value T is separately set near the dispersion tolerance. When the error correction count has exceeded the threshold value U, adjustment of the dispersion value is temporarily suspended. In another technique, the adjustment step value for single adjustments of the dispersion value is decreased.

However, related art that adjusts the dispersion value by using the above two threshold values requires a process for changing settings between the threshold values, as well as a process for suspending adjustment of the dispersion value. For this reason, there is a problem in that the dispersion value adjustment process becomes more complicated overall. Meanwhile, in related art that decreases the dispersion value adjustment step value, the time until the dispersion value reaches the optimal value increases to the degree that the dispersion value adjustment step value is decreased. For this reason, there is a problem in that the dispersion value adjustment process becomes delayed. Technology related to the foregoing is disclosed in Japanese Unexamined Patent Application Publication No. 2007-306371.

SUMMARY

According to an aspect of the disclosed embodiments, an optical receiver includes a dispersion mitigator configured to mitigate a wavelength dispersion value in an optical signal by using a set dispersion value, a phase difference signal generator configured to generate a phase difference signal by calculating the phase difference between a first clock signal included in an optical signal mitigated by the dispersion mitigator, and a second clock signal, a dispersion value adjuster configured to adjust the set dispersion value set in the dispersion mitigator, a controller configured to control fluctuations appearing in a phase difference signal generated by the phase difference signal generator when the dispersion value is adjusted by the dispersion value adjuster, and a clock generator configured to generate the second clock follow up the phase of the first clock, being based on the phase difference signal controlled by the controller.

The object and advantages of the disclosed embodiments will be realized and attained at least by the elements, features, and combinations particularly pointed out in the claims.

It is to be understood that both the foregoing general description and the following detailed description are exemplary and explanatory and are not restrictive of the disclosed embodiments, as claimed.

BRIEF DESCRIPTION OF DRAWINGS

FIG. 13 illustrates the relationship between the dispersion value and the error correction count;

FIG. 14 illustrates the relationship between the dispersion value and the error correction count in the case where the OSNR is favorable;

FIG. 15 illustrates one example of an electrical signal input into the CR before adjusting the dispersion value; and FIG. 16 illustrates one example of an electrical signal input into the CR after adjusting the dispersion value.

DESCRIPTION OF EMBODIMENTS

Hereinafter, embodiments of the optical receiver and the clock generation method disclosed in the present application will be described in detail on the basis of the drawings. However, it should be appreciated that the optical receiver and the clock generation method disclosed in the present application are not limited by the following embodiments.

Figure 1:
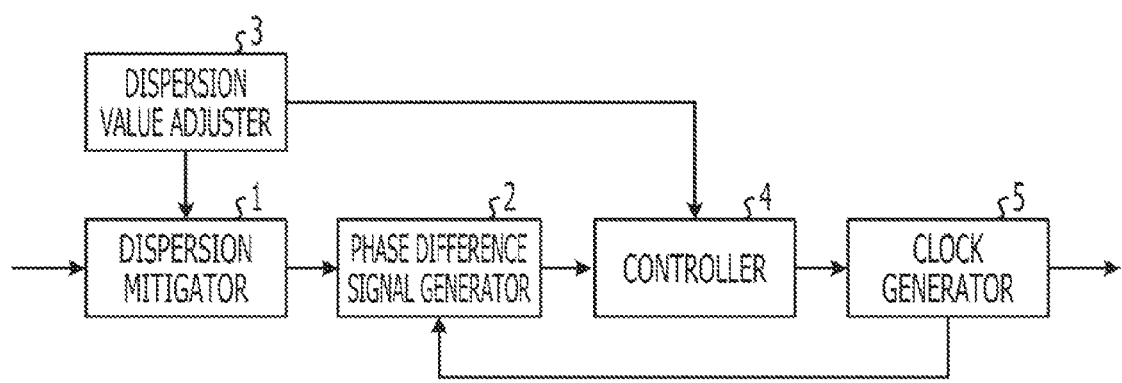
FIG. 1 illustrates a configuration of an optical receiver in accordance with a first embodiment.

First, an optical receiver in accordance with a first embodiment will be described. FIG. 1 illustrates a configuration of an optical receiver in accordance with a first embodiment. As illustrated in FIG. 1, the optical receiver in accordance with the first embodiment includes a dispersion mitigator 1, a phase difference signal generator 2, a dispersion value adjuster 3, a controller 4, and a clock generator 5.

The dispersion mitigator 1 mitigates a wavelength dispersion value in the optical signal by using a set dispersion value. The phase difference signal generator 2 generates a phase difference signal by calculating the phase difference between an external clock (a first clock) included in the optical signal mitigated by the dispersion mitigator 1, and an internal clock (a second clock) used inside the optical receiver receiving the optical signal.

The dispersion value adjuster 3 adjusts the dispersion value set in the dispersion mitigator 1. The controller 4 controls fluctuations that appear in the phase difference signal generated by the phase-difference signal generator 2 when the dispersion value of the dispersion mitigator 1 is adjusted by the dispersion value adjuster 3.

Based on the phase difference signal controlled by the controller 4, the clock generator 5 generates an internal clock synchronized with the external clock. Herein, the clock generator 5 outputs the internal clock signal thus generated to an external apparatus, while also feeding back the internal clock signal to the phase-difference signal generator 2.

As described above, the optical receiver in accordance with the first embodiment is configured as follows. When the dispersion value set in the dispersion mitigator 1 is adjusted, fluctuations appearing in the phase difference signal between the external clock and the internal clock are controlled, and an internal clock synchronized with the external clock is generated based on the controlled phase difference. In so doing, the optical receiver in accordance with the first embodiment is able to generate an accurate internal clock, even when the external clock is momentarily attenuated after adjusting the dispersion value set in the dispersion mitigator 1. As a result, the optical receiver in accordance with the first embodiment is able to avoid an unlocked state when adjusting the dispersion value.

In addition, the optical receiver in accordance with the first embodiment controls fluctuations in the phase difference signal during normal processing for adjusting the dispersion value, and generates an internal clock based on the controlled phase difference signal. For this reason, the optical receiver in accordance with the first embodiment does not need to conduct extra processing for changing the threshold value settings or suspending adjustment of the dispersion value as in the related art, nor does the optical receiver in accordance with the first embodiment need to change the dispersion value adjustment range like the related art. Consequently, the optical receiver in accordance with the first embodiment is able to easily and rapidly adjust the dispersion value while avoiding an unlocked state.

Next, a specific example of the optical receiver described in the above first embodiment will be described as a second embodiment. The second embodiment describes the example of applying the optical receiver described in the above first embodiment to an optical receiver that receives optical signals at a transmission speed of 40 Gbps.

Figure 2:
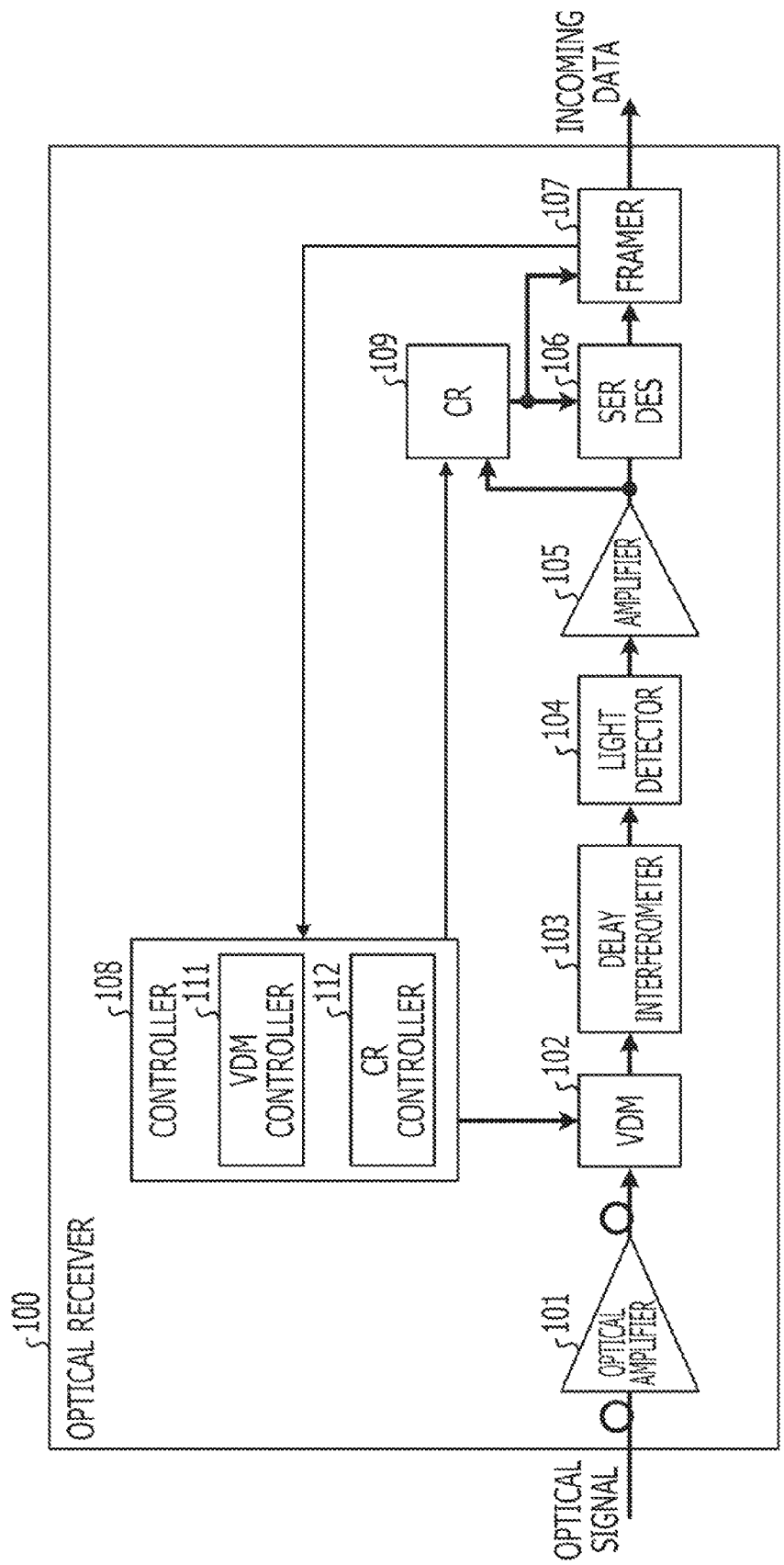
FIG. 2 illustrates a configuration of an optical receiver in accordance with a second embodiment.

First, a configuration of the optical receiver in accordance with a second embodiment will be described. FIG. 2 illustrates a configuration of an optical receiver in accordance with a second embodiment. As illustrated in FIG. 2, the optical receiver 100 in accordance with the second embodiment includes an optical amplifier 101, a VDM 102, a delay interferometer 103, a light detector 104, an amplifier 105, a SerDes 106, and a framer 107. In addition, the optical receiver 100 includes a controller 108 and a CR 109. Of these, the optical amplifier 101 amplifies an optical signal input from an optical transmission line.

The VDM 102 mitigates a wavelength dispersion value in the optical signal by using a set dispersion value. More specifically, the VDM 102 uses a dispersion value set by the VDM controller 111 hereinafter described to mitigate a wavelength dispersion value in the optical signal that was amplified by the optical amplifier 101. Herein, the VDM 102 is one example of the dispersion mitigator 1 in the first embodiment.

The delay interferometer 103 demodulates the optical signal mitigated by the VDM 102. The delay interferometer 103 may be a Mach-Zehnder delay interferometer, for example. The light detector 104 converts the optical signal demodulated by the delay interferometer 103 into an electrical signal. The amplifier 105 amplifies the electrical signal converted by the light detector 104, and outputs the amplified electrical signal to the CR 109 and the SerDes 106. The SerDes 16 identifies the electrical signal from the amplifier 105 as being 0 or 1 data, based on the clock generated by the CR 109, and outputs an incoming data signal expressing the identification results to the framer 107.

Based on the clock generated by the CR 109, the framer 107 corrects errors in the incoming data signal from the SerDes 106, and outputs the corrected incoming data signal to external apparatus not illustrated in FIG. 2. In addition, the framer 107 detects an error correction count, which expresses the number of errors that were corrected in the incoming data signal from the SerDes 106. The detected error correction count is output to the controller 108.

Figure 3:
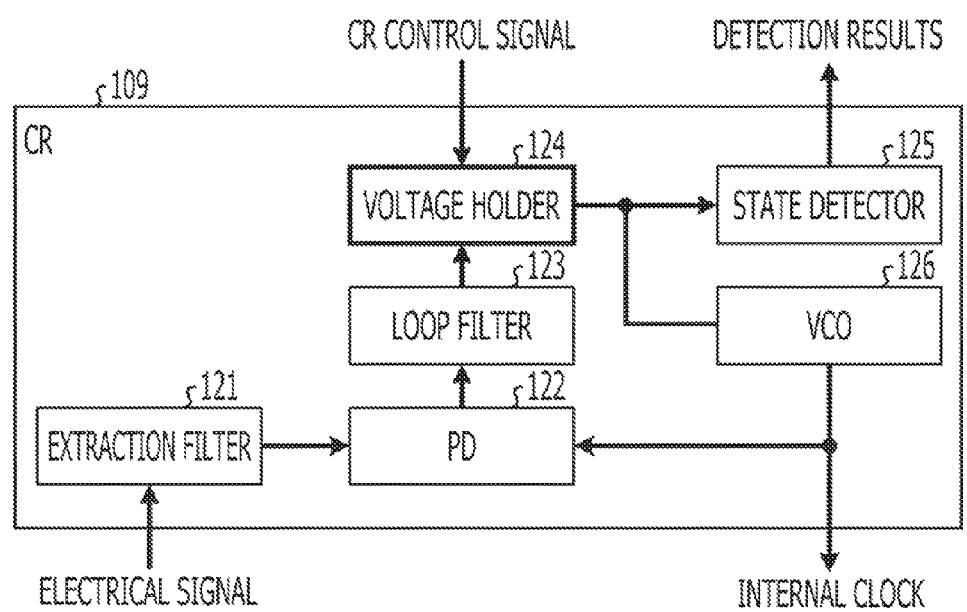
FIG. 3 illustrates a configuration of the CR in a second embodiment.

In accordance with control by the controller 108, the CR 109 controls the phase difference between the clock included in the optical signal from the VDM 102 (hereinafter referred to as the external clock), and the clock generated by the CR 109 itself. In so doing, the CR 109 generates a clock synchronized with the external clock, based on the controlled phase difference. FIG. 3 illustrates a configuration of the CR 109 in the second embodiment. As illustrated in FIG. 3, the CR 109 includes an extraction filter 121, a phase detector (PD) 122, a loop filter 123, a voltage holder 124, a state detector 125, and a VCO 126. The extraction filter 121 extracts the external clock from an electrical signal input from the amplifier 105.

The PD 122 generates a phase difference signal by calculating the phase difference between the external clock extracted by the extraction filter 121, and a clock output from the VCO 126 (hereinafter referred to as the internal clock). The loop filter 123 removes high-frequency components from the phase difference signal generated by the PD 122 by using a given time constant. The loop filter 123 may be a low-pass filter, for example.

The voltage holder 124 holds the voltage of the phase difference signal input from the PD 122 via the loop filter 123 when the dispersion value in the VDM 102 is adjusted. The voltage-held phase difference signal is then supplied to the VCO 126. More specifically, upon receiving a CR control signal hereinafter described from the controller 108, the voltage holder 124 holds the voltage of the phase difference signal input from the PD 122 via the loop filter 123 in a capacitor or similar component. The voltage-held phase difference signal is then supplied to the VCO 126. In contrast, if the output of the CR control signal from the controller 108 has stopped, then the voltage holder 124 releases the hold on the voltage in the capacitor, and directly supplies the VCO 126 with the phase difference signal input from the PD 122 via the loop filter 123. In so doing, the voltage holder 124 is able to control extreme fluctuations in the phase difference signal that may appear when adjusting the dispersion value in the VDM 102, and supply the VCO 126 with a controlled phase difference signal.

The state detector 125 detects the state of the phase difference signal input from the PD 122 via the loop filter 123 and the voltage holder 124, and causes the detection results to be displayed on a given display apparatus. For example, the state detector 125 may detect the voltage value of the phase difference signal, and cause the detected voltage value to be displayed on a given display apparatus.

The VCO 126 generates an internal clock synchronized with the phase of the external clock, based on the phase difference signal input from the PD 122 via the loop filter 123 and the voltage holder 124. Herein, the PD 122, the voltage holder 124, and the VCO 126 are respective examples of the phase difference signal generator 2, the controller 4, and the clock generator 5 in the first embodiment.

Returning to FIG. 2, the controller 108 conducts overall control of the optical receiver 100, and executes various processes conducted by the optical receiver 100, such as the dispersion value adjustment process, for example. More specifically, the controller 108 includes a VDM controller 111 and a CR controller 112.

The VDM controller 111 adjusts the dispersion value set in the VDM 102, based on the error correction count from the framer 107, and re-sets the adjusted, enhanced dispersion value in the VDM 102. More specifically, upon accepting given start conditions, the VDM controller 111 computes a new dispersion value by adding or subtracting a given adjustment step value to the current dispersion value set in the VDM 102. Herein, the given start conditions may include various conditions, such as device power-on, a periodic adjustment request issued during device operation, or a notification from the framer 107 indicating that the error correction count has exceeded a given value, for example.

Subsequently, the VDM controller 111 outputs an adjustment start notification to the CR controller 112. The adjustment start notification is a notification indicating that the dispersion value set in the VDM 102 is to be adjusted. The VDM controller 111 then adjusts the current dispersion value set in the VDM 102 to the computed dispersion value. The VDM controller 111 then acquires the error correction count from the framer 107. Herein, the VDM controller 111 stores the computed dispersion value and the error correction count in association with each other in given memory. Subsequently, the VDM controller 111 outputs an adjustment end notification to the CR controller 112. The adjustment end notification is a notification indicating that adjustment of the dispersion value in the VDM 102 has ended. The VDM controller 111 then determines whether or not the number of adjustments to the dispersion value has reached a stipulated count. If the number of adjustments to the dispersion value has not yet reached the stipulated count, then the dispersion value is re-computed, and the dispersion value in the VDM 102 is re-adjusted to the newly computed dispersion value. In contrast, if the number of adjustments to the dispersion value has reached the stipulated count, then the VDM controller 111 takes the computed dispersion values, and from among them specifies the particular dispersion value for which the error correction count is reduced. The VDM controller 111 then sets the specified dispersion value in the VDM 102. Herein, the VDM controller 111 is one example of the dispersion value adjuster 3 in the first embodiment.

The CR controller 112 outputs to the CR 109 a CR control signal for controlling the operation of the CR 109 in accordance with the adjustment of the dispersion value in the VDM 102. More specifically, upon receiving an adjustment start notification from the VDM controller 111, the CR controller 112 outputs the CR control signal to the CR 109. In contrast, upon receiving an adjustment end notification from the VDM controller 111, the CR controller 112 stops output of the CR control signal to the CR 109.

Figure 4:
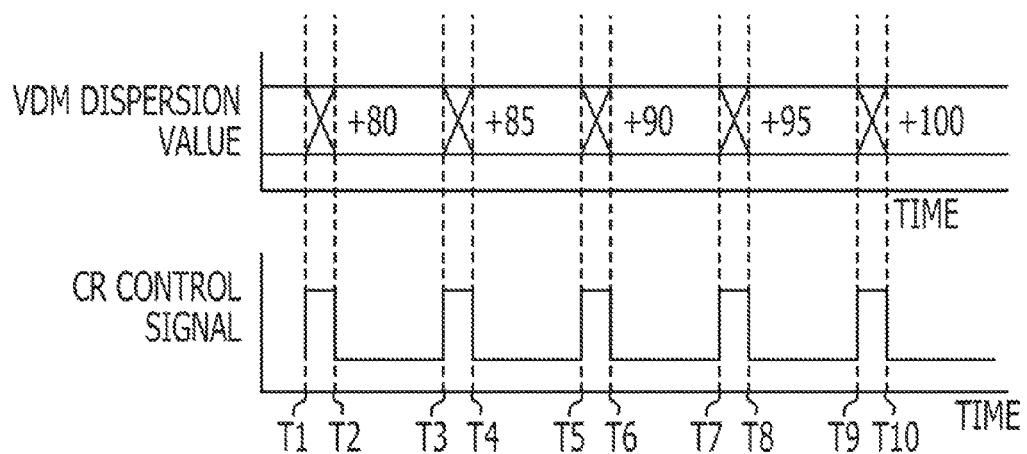
FIG. 4 illustrates one example of output timings for a CR control signal output by the CR controller.

The processing executed by the CR controller 112 will now be described in further detail. FIG. 4 illustrates one example of output timings for a CR control signal output by the CR controller 112. In FIG. 4, the horizontal axis represents time. As illustrated in FIG. 4, the CR controller 112 starts output of the CR control signal with respect to the CR 109 at the times T1, T3, T5, T7, and T9 when an adjustment start notification is received from the VDM controller 111. In the present embodiment, the voltage holder 124 of the CR 109 receives the CR control signal from the CR controller 112. Upon receiving the CR control signal from the CR controller 112, the voltage holder 124 holds the voltage of the difference phase signal input from the PD 122 via the loop filter 123 in a capacitor or similar component. The voltage-held difference phase signal is then supplied to the VCO 126. The VCO 126 then generates an internal clock based on the difference phase signal with its voltage held by the voltage holder 124.

In contrast, the CR controller 112 stops output of the CR control signal to the CR 109 at the times T2, T4, T6, and T8 when an adjustment stop notification is received from the VDM controller 111. If the output of the CR control signal from the CR controller 112 is stopped, then the voltage holder 124 releases the hold on the voltage in the capacitor, and directly supplies the VCO 126 with the phase difference signal input from the PD 122 via the loop filter 123. The VCO 126 then generates an internal clock based on the phase difference signal supplied from the voltage holder 124. In so doing, the VCO 126 is able to correctly generate an internal clock, even in cases of extreme fluctuation in the phase difference signal from the PD 122 due to adjustment of the dispersion value in the VDM 102.

Figure 5:
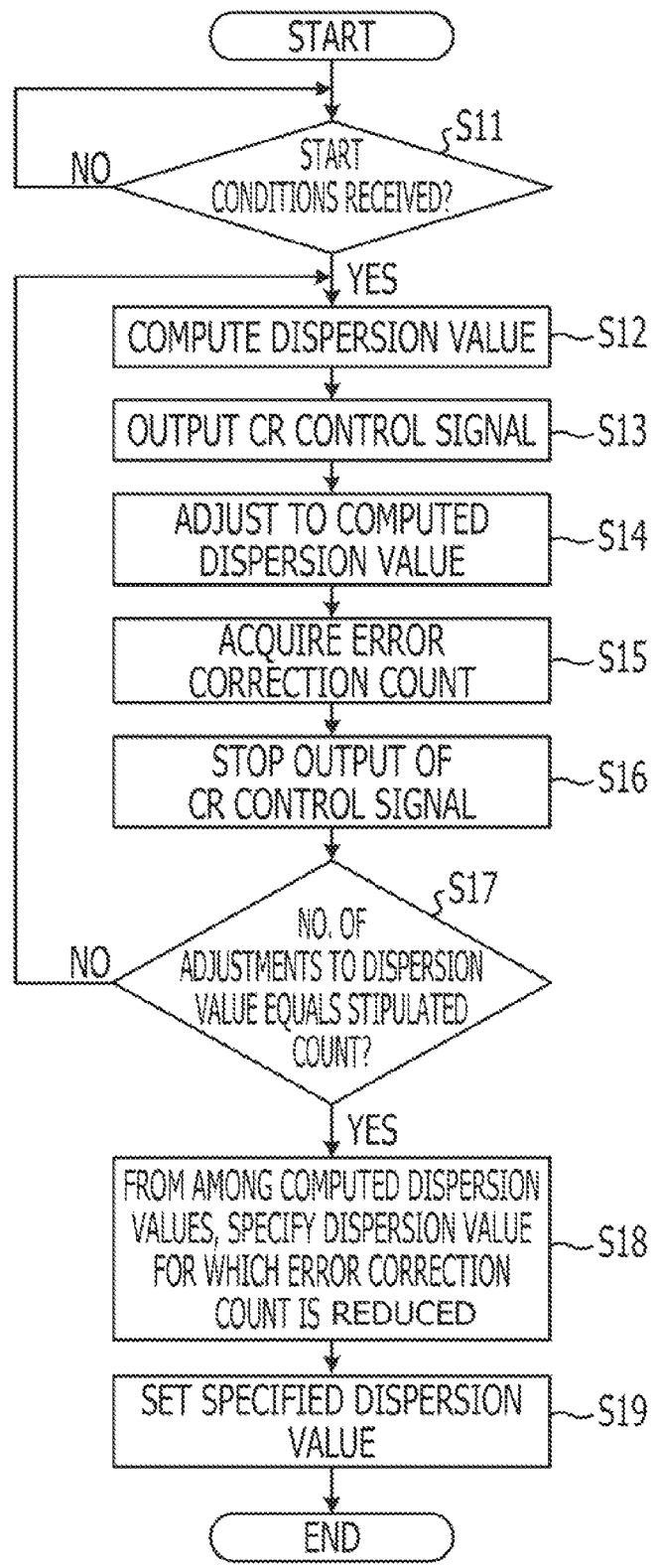
FIG. 5 is a flowchart illustrating a processing sequence of a dispersion value adjustment process executed by an optical receiver in accordance with a second embodiment.

Next, a processing sequence of a dispersion value adjustment process executed by the optical receiver 100 in accordance with the second embodiment will be described. FIG. 5 is a flowchart illustrating a processing sequence of a dispersion value adjustment process executed by the optical receiver 100 in accordance with the second embodiment. As illustrated in FIG. 5, in the optical receiver 100, the VDM controller 111 stands by until given start conditions are received (operation S11: No). Herein, the given start conditions may include various conditions, such as device power-on, a periodic adjustment request issued during device operation, or a notification from the framer 107 indicating that the error correction count has exceeded a given value, for example. Once given start conditions are received (operation S11: Yes), the VDM controller 111 computes a new dispersion value by adding or subtracting a given adjustment step value to the current dispersion value set in the VDM 102 (operation S12).

The VDM controller 111 outputs an adjustment start notification to the CR controller 112. Having received the adjustment start notification, the CR controller 112 outputs a CR control signal to the CR 109 (operation S13). The VDM controller 111 adjusts the current dispersion value set in the VDM 102 to the computed dispersion value (operation S14), and acquires an error correction count from the framer 107 (operation S15).

The VDM controller 111 outputs an adjustment end notification to the CR controller 112. Having received the adjustment end notification, the CR controller 112 stops output of the CR control signal to the CR 109 (operation S16). The VDM controller 111 determines whether or not the number of adjustments to the dispersion value has reached a stipulated count (operation S17). If the number of adjustments to the dispersion value has not yet reached the stipulated count (operation S17: No), then the process returns to operation S12.

In contrast, if the number of adjustments to the dispersion value has reached the stipulated count (operation S17: Yes), the VDM controller 111 takes the computed dispersion values, and from among them specifies the particular dispersion value for which the error correction count is reduced (operation S18). The VDM controller 111 sets the specified dispersion value in the VDM 102 (operation S19).

Figure 6:
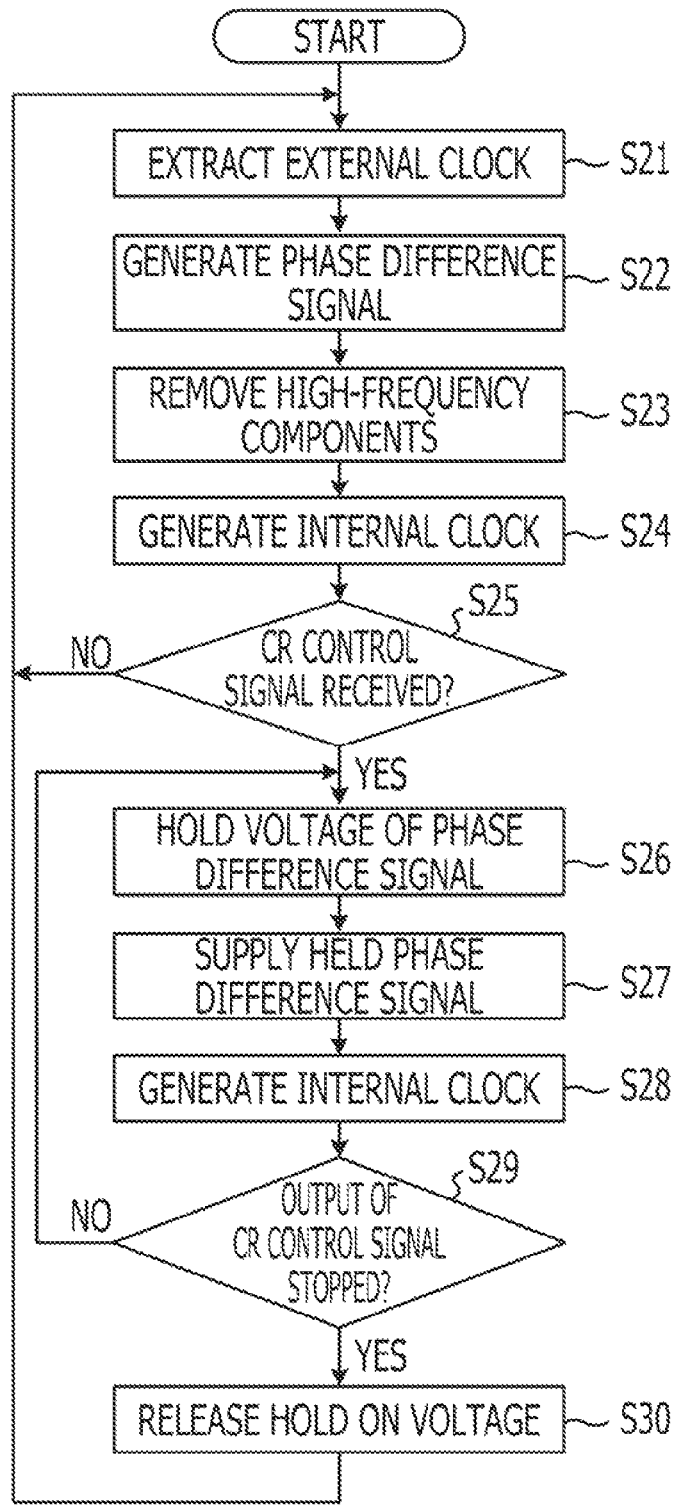
FIG. 6 is a flowchart illustrating a processing sequence of the CR in a second embodiment.

Next, a processing sequence of the CR 109 in the second embodiment will be described. FIG. 6 is a flowchart illustrating a processing sequence of the CR 109 in the second embodiment. As illustrated in FIG. 6, the extraction filter 121 of the CR 109 extracts an external clock from an electrical signal input from the amplifier 105 (operation S21). The PD 122 generates a phase difference signal from the external clock extracted by the extraction filter 121 and the internal clock output from the VCO 126 (operation S22).

The loop filter 123 removes high-frequency components from the phase difference signal generated by the PD 122 (operation S23). The VCO 126 generates an internal clock synchronized with the phase of the external clock based on the phase difference signal input from the PD 122 via the loop filter 123 and the voltage holder 124 (operation S24).

The voltage holder 124 determines whether or not a CR control signal has been received from the CR controller 112 (operation S25). If a CR control signal has not been received from the CR controller 112 (operation S25: No), the process returns to operation S21, and the voltage holder 124 directly supplies the VCO 126 with the phase difference signal input from the PD 122 via the loop filter 123.

In contrast, if a CR control signal has been received from the CR controller 112 (operation S25: Yes), the voltage holder 124 holds the voltage of the phase difference signal input from the PD 122 via the loop filter 123 in a capacitor or similar component (operation S26). The voltage holder 124 supplies the voltage-held phase difference signal to the VCO 126 (operation S27). The VCO 126 generates an internal clock synchronized with the phase of the external clock based on the phase difference signal with its voltage held by the voltage holder 124 (operation S28).

The voltage holder 124 determines whether or not the output of the CR control signal from the CR controller 112 has stopped (operation S29). If the output of the CR control signal has not stopped (operation S29: No), the processing from operations S26 to S29 is repeated. In contrast, if the output of the CR control signal from the CR controller 112 has stopped (operation S29: Yes), the voltage holder 124 releases the hold on the voltage in the capacitor (operation S30). The process returns to operation S21, and the voltage holder 124 directly supplies the VCO 126 with the phase difference signal input from the PD 122 via the loop filter 123.

As described above, an optical receiver 100 in accordance with the second embodiment is configured as follows. When a dispersion value set in a VDM 102 is adjusted, fluctuations appearing in a phase difference signal between an external clock and an internal clock are controlled, and an internal clock synchronized with the external clock based on the controlled phase difference signal is generated. In so doing, the optical receiver 100 is able to generate an accurate internal clock, even in cases where the external clock momentarily attenuates after adjusting the dispersion value set in the VDM 102. As a result, the optical receiver 100 is able to avoid an unlocked state when adjusting the dispersion value.

In addition, an optical receiver 100 in accordance with the second embodiment is configured as follows. In an ordinary process for adjusting the dispersion value, the voltage of the phase difference signal is held by a voltage holder 124, and fluctuations appearing in the phase difference signal are controlled by supplying the held phase difference signal to the VCO 126. The optical receiver 100 then generates an internal clock synchronized with the external clock based on the fluctuation-controlled phase difference signal. For this reason, the optical receiver 100 does not need to conduct extra processing for changing the threshold value settings or suspending adjustment of the dispersion value as in the related art, nor does the optical receiver in accordance with the first embodiment need to change the dispersion value adjustment range like the related art. Consequently, the optical receiver 100 is able to easily and rapidly adjust the dispersion value while avoiding an unlocked state.

The above second embodiment illustrates an example of controlling fluctuations appearing in the phase difference signal when adjusting the dispersion value in the VDM 102 by holding the voltage of the phase difference signal, and supplying the held phase difference signal to the VCO 126. However, fluctuations appearing in the phase difference signal may also be controlled by modifying the time constant of the loop filter that removes high-frequency components from the phase difference signal. Thus, a third embodiment describes an example of controlling fluctuations appearing in the phase difference signal by modifying the time constant of the loop filter that removes high-frequency components from the phase difference signal.

Figure 7:
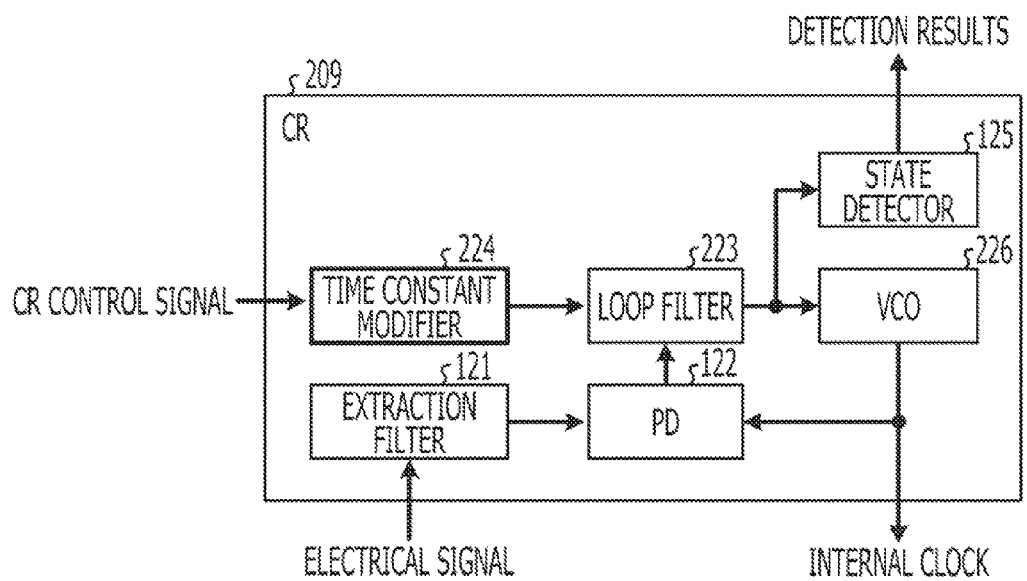
FIG. 7 illustrates a configuration of the CR in a third embodiment.

First, a configuration of a CR included in an optical receiver 200 in accordance with a third embodiment will be described. FIG. 7 illustrates a configuration of the CR 209 in a third embodiment. Hereinafter, components having substantially similar functions to the components illustrated in FIG. 3 will be given identical reference numbers, and detailed description of such components will be omitted. Furthermore, since the configuration of the optical receiver 200 in accordance with the third embodiment is substantially similar to the configuration illustrated in FIG. 2, further description thereof is herein omitted.

As illustrated in FIG. 7, the CR 209 includes a loop filter 223, a time constant modifier 224, and a VCO 226 instead of the loop filter 123, the voltage holder 124, and the VCO 126 included in the CR 109 illustrated in FIG. 3.

The loop filter 223 removes high-frequency components from the phase difference signal generated by the PD 122 by using a first time constant $\tau 1$ or a second time constant $\tau 2$ that is greater than the first time constant $\tau 1$. The loop filter 223 may be a low-pass filter, for example. The amount of high-frequency component removal amount corresponding to the second time constant $\tau 2$ is greater than the high-frequency component removal amount corresponding to the first time constant $\tau 1$.

The time constant modifier 224 modifies the time constant used by the loop filter 223 when the dispersion value in the VDM 102 is adjusted. More specifically, when a CR control signal is received from the CR controller 112, the time constant modifier 224 modifies the time constant used by the loop filter 223 from the first time constant $\tau 1$ to the second time constant $\tau 2$ that is greater than the first time constant $\tau 1$. When the time constant is modified to the second time constant $\tau 2$, the loop filter 223 removes more high-frequency components from the phase difference signal than the high-frequency components corresponding to the first time constant $\tau 1$. In contrast, when the output of the CR control signal from the CR controller 112 is stopped, the time constant modifier 224 reverts the time constant used by the loop filter 223 from the second time constant $\tau 2$ to the first time constant $\tau 1$. In so doing, the time constant modifier 224 is able to control extreme fluctuations appearing in the phase difference signal due to adjustment of the dispersion value in the VDM 102, and supply a controlled phase difference signal to the VCO 226.

The VCO 226 generates an internal clock synchronized with the phase of the external clock based on the phase difference signal input from the PD 122 via the loop filter 223. Herein, the time constant modifier 224 and the VCO 226 are respective examples of the controller 4 and the clock generator 5 in the first embodiment.

Figure 8:
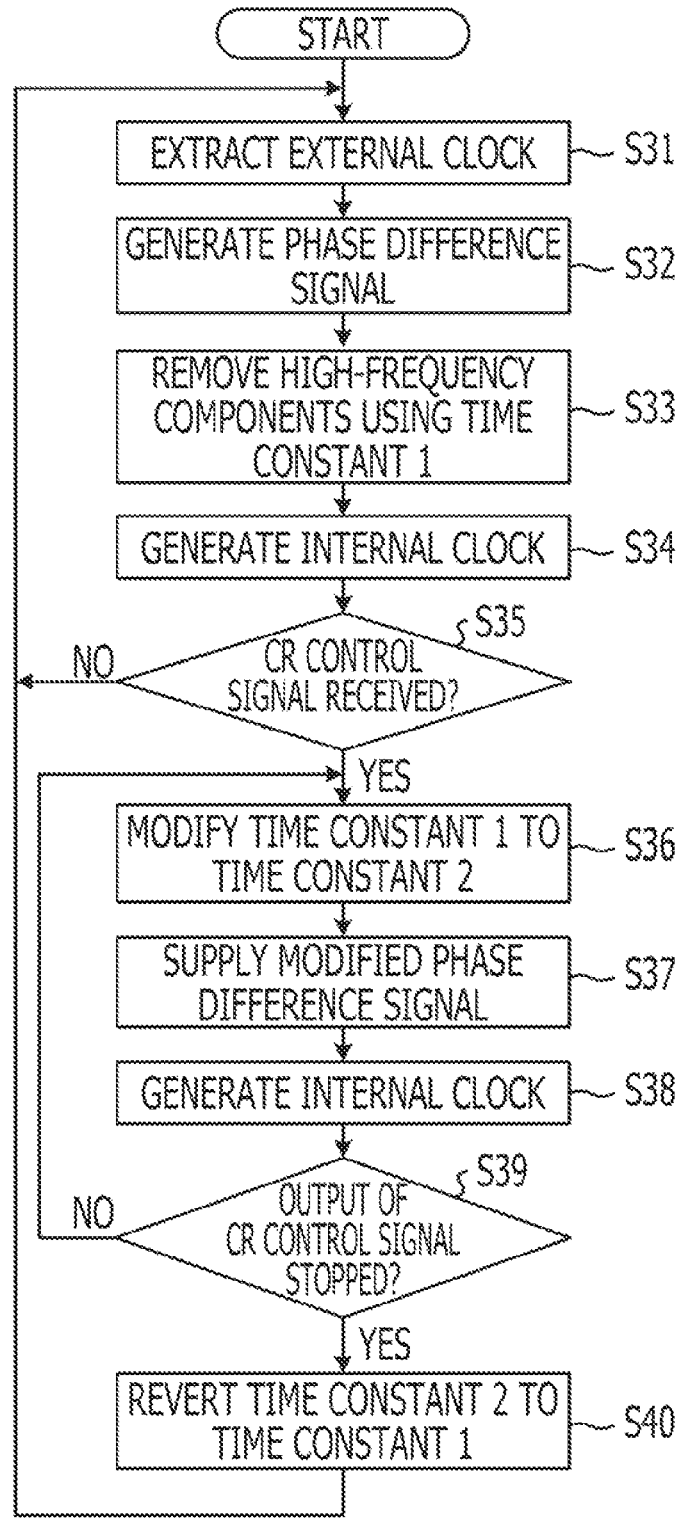
FIG. 8 is a flowchart illustrating a processing sequence of the CR in a third embodiment.

Next, a processing sequence of the CR 209 in the third embodiment will be described. FIG. 8 is a flowchart illustrating a processing sequence of the CR 209 in the third embodiment. As illustrated in FIG. 8, the extraction filter 121 of the CR 209 extracts an external clock from an electrical signal input from the amplifier 105 (operation S31). The PD 122 generates a phase difference signal from the external clock extracted by the extraction filter 121 and an internal clock output from the VCO 226 (operation S32).

The loop filter 223 removes high-frequency components from the phase difference signal generated by the PD 122 using the first time constant $\tau 1$ (operation S33). The VCO 226 generates an internal clock synchronized with the phase of the external clock based on the phase difference signal input from the PD 122 via the loop filter 223 (operation S34).

The time constant modifier 224 determines whether or not a CR control signal has been received from the CR controller 112 (operation S35). If a CR control signal has not been received from the CR controller 112 (operation S35: No), the process returns to operation S31, and the time constant modifier 224 keeps the time constant used by the loop filter 223 at the first time constant $\tau 1$.

In contrast, if a CR control signal has been received from the CR controller 112 (operation S35: Yes), the time constant modifier 224 modifies the time constant used by the loop filter 223 from the first time constant $\tau 1$ to the second time constant $\tau 2$ that is greater than the first time constant $\tau 1$ (operation S36). If the time constant is modified to the second time constant $\tau 2$, then the loop filter 223 removes more high-frequency components from the phase difference signal than the high-frequency components corresponding to the first time constant $\tau 1$, and supplies the post-removal phase difference signal to the VCO 226 (operation S37). The VCO 226 generates an internal clock synchronized with the phase of the external clock based on the phase difference signal whose high-frequency components were removed by the loop filter 223 with the second time constant (operation S38).

The time constant modifier 224 determines whether or not output of the CR control signal from the CR controller 112 has stopped (operation S39). If the output of the CR control signal has not stopped (operation S39: No), the processing in operations S36 to S39 is repeated. In contrast, if the output of the CR control signal from the CR controller 112 has stopped (operation S39: Yes), the time constant modifier 224 reverts the time constant used by the loop filter 223 from the second time constant τ2 to the first time constant τ1 (operation S40). The process returns to operation S31, and the time constant modifier 224 keeps the time constant used by the loop filter 223 at the first time constant τ1.

As described above, the optical receiver 200 in accordance with the third embodiment is configured as follows. When a dispersion value in the VDM 102 is adjusted, fluctuations appearing in a phase difference signal are controlled by modifying the time constant of the loop filter 223 to a time constant that is greater than the current time constant. For this reason, the optical receiver 200 is able to control fluctuations appearing in the phase difference signal just by conducting a simple process of modifying the time constant of an existing loop filter. As a result, the optical receiver 200 is able to efficiently avoid an unlocked state when adjusting the dispersion value.

The foregoing second embodiment illustrates an example of controlling fluctuations appearing in the phase difference signal when adjusting the dispersion value in the VDM 102 by holding the voltage of the phase difference signal, and supplying the held phase difference signal to the VCO 126. However, fluctuations appearing in the phase difference signal may also be controlled by modifying the gain of the phase difference signal. Thus, a fourth embodiment describes an example of controlling fluctuations appearing in the phase difference signal by modifying the gain of the phase difference signal.

Figure 9:
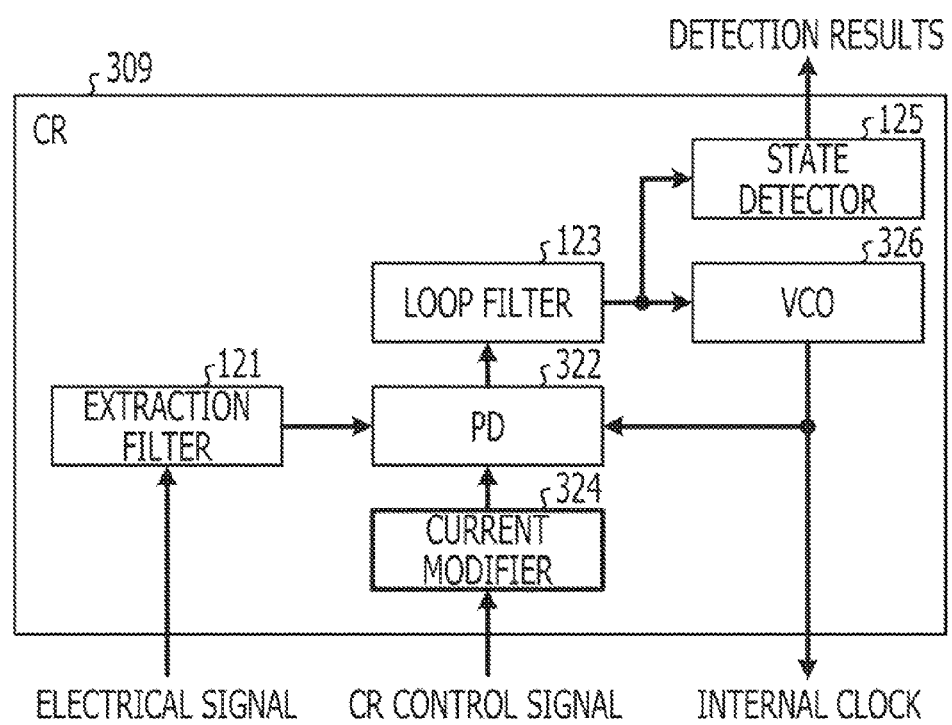
FIG. 9 illustrates a configuration of the CR in a fourth embodiment.

First, a configuration of the CR included in an optical receiver 300 in accordance with a fourth embodiment will be described. FIG. 9 illustrates a configuration of the CR 309 in a fourth embodiment. Hereinafter, components having substantially similar functions to the components illustrated in FIG. 3 will be given identical reference numbers, and detailed description of such components will be omitted. Furthermore, since the configuration of the optical receiver 300 in accordance with the fourth embodiment is substantially similar to the configuration illustrated in FIG. 2, further description thereof is herein omitted.

As illustrated in FIG. 9, the CR 309 includes a PD 322, a current modifier 324, and a VCO 326 instead of the PD 122, the voltage holder 124, and the VCO 126 included in the CR 109 illustrated in FIG. 3.

The PD 322 generates a phase difference signal by calculating the phase difference between an external clock extracted by the extraction filter 121 and an internal clock output from the VCO 326. The PD 322 also modifies the gain of the generated phase difference signal.

Figure 10:
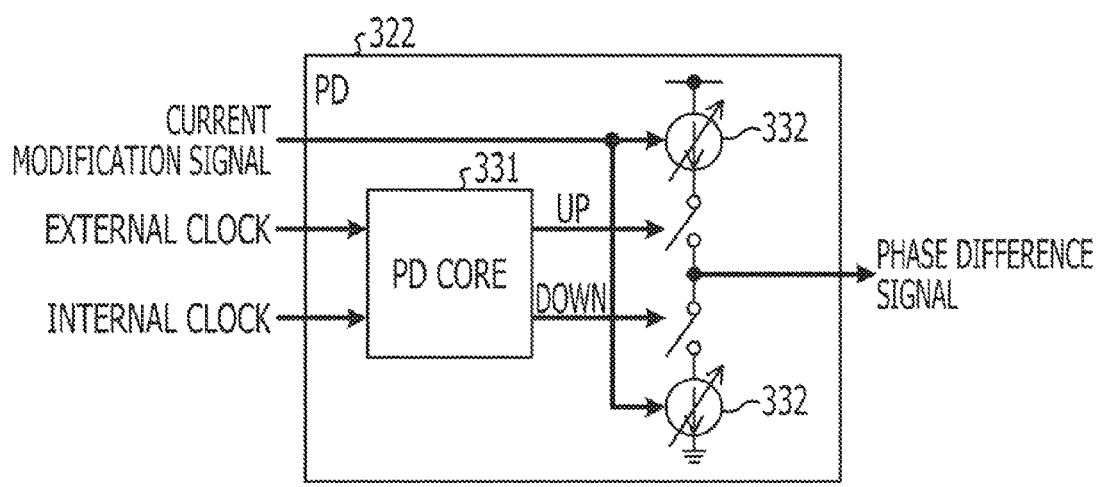
FIG. 10 is a detailed view of the PD illustrated in FIG. 9.

A specific configuration of the PD 322 will now be described. FIG. 10 is a detailed view of the PD 322 illustrated in FIG. 9. As illustrated in FIG. 10, the PD 322 includes a PD core 331 and current sources 332.

The PD core 331 computes the phase difference between an external clock and an internal clock by comparing the edge of an external clock output from the extraction filter 121 to the edge of an internal clock output from the VCO 326. In addition, depending on the computed phase difference, the PD core 331 outputs to the current sources 332 an up signal for advancing the phase of the internal clock, or a down signal for delaying the phase of the internal clock.

The current sources 332 generate currents for determining the gain of the phase difference signal output from the PD 322. The current sources 332 amplify an up signal or down signal input from the PD core 331 using a current, and output the amplified up signal or down signal to the loop filter 123 as a phase difference signal. The current sources 332 also modify the current that is generated, in response to a current modification signal input from the current modifier 324.

Returning to FIG. 9, when the dispersion value in the VDM 102 is adjusted, the current modifier 324 modifies the current output from the current sources 332 of the PD 322. More specifically, upon receiving a CR control signal from the CR controller 112, the current modifier 324 outputs to the current sources 332 of the PD 322 a current modification signal instructing the current sources 332 to modify the current to a current I2 that is less than the present current I1. Having received the current modification signal, the current sources 332 of the PD 322 modify the current I1 to the current I2. Once the current I1 is modified to the current I2, the PD 322 amplifies the phase difference signal with a gain that is smaller than the gain corresponding to the current I1, and outputs the amplified phase difference signal to the loop filter 123. In contrast, when the CR control signal from the CR controller 112 is stopped, the current modifier 324 outputs to the current sources 332 of the PD 322 a current modification signal instructing the current sources 332 to revert the current I2 back to the current I1. Having received the current modification signal, the current sources 332 of the PD 322 revert the current I2 back to the current I1. Once the current I2 is modified to the current I1, the PD 322 amplifies the phase difference signal with a gain that is greater than the gain corresponding to the current I2, and outputs the amplified phase difference signal to the loop filter 123. In so doing, the current modifier 324 is able to control extreme fluctuations appearing in the phase difference signal due to adjustment of the dispersion value in the VDM 102, and supply the controlled phase difference signal to the VCO 326 via the loop filter 123.

The VCO 326 generates an internal clock synchronized with phase of the external clock based on a phase difference signal output from the PD 322 via the loop filter 123. Herein, the PD 322, the current modifier 324, and the VCO 326 are respective examples of the phase difference signal generator 2, the controller 4, and the clock generator 5 in the first embodiment.

Figure 11:
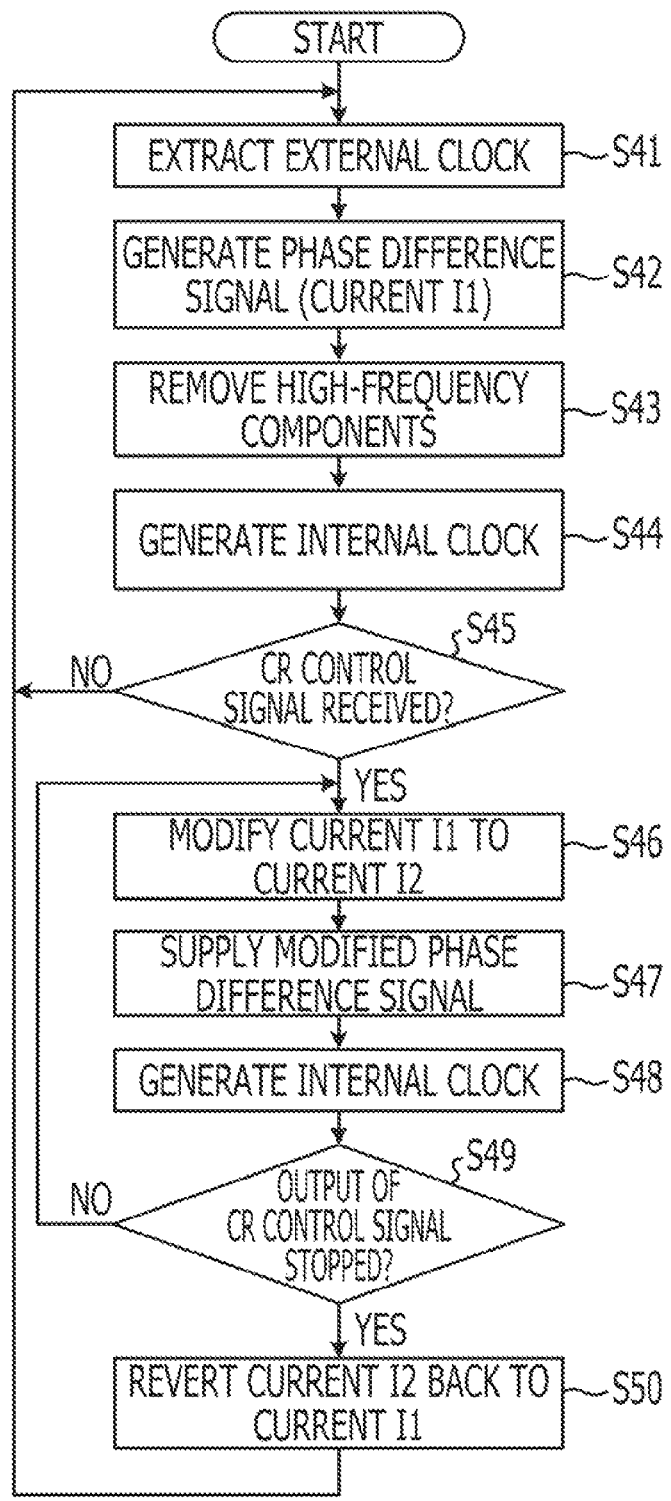
FIG. 11 is a flowchart illustrating a processing sequence of the CR in a fourth embodiment.
Figure 12:
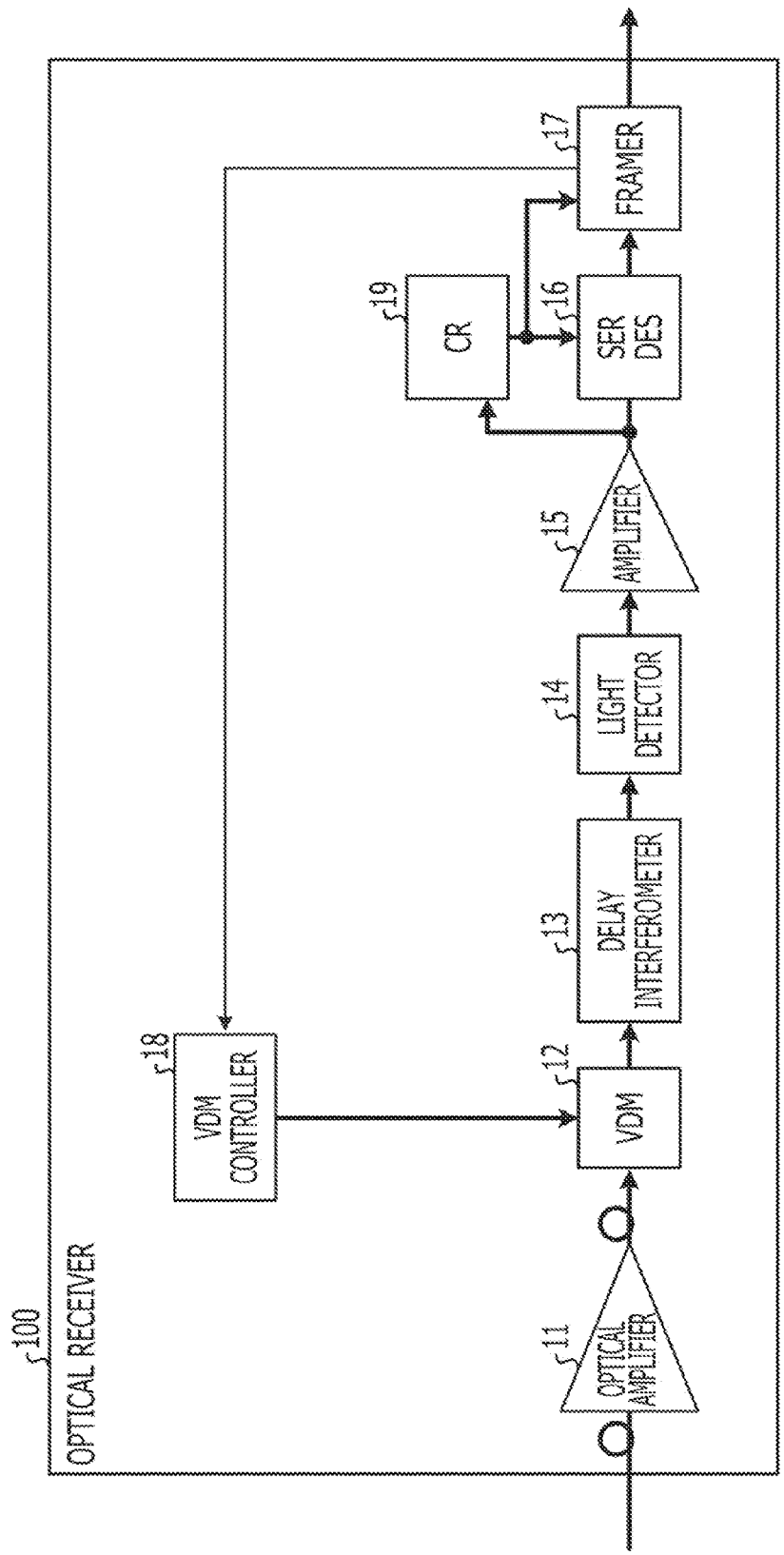
FIG. 12 explains an optical receiver in accordance with the related art, wherein technology for mitigating a wavelength dispersion value has been adopted.

Next, a processing sequence of the CR 309 in the fourth embodiment will be described. FIG. 11 is a flowchart illustrating a processing sequence of the CR 309 in the fourth embodiment. As illustrated in FIG. 11, the extraction filter 121 of the CR 309 extracts an external clock from an electrical signal input from the amplifier 105 (operation S41). The PD 322 generates a phase difference signal from the external clock extracted by the extraction filter 121 and an internal clock output from the VCO 326 (operation S42). The current sources 332 of the PD 322 amplify an up signal or a down signal input from the PD core 331 using a current I1, and output the amplified up signal or down signal to the loop filter 123 as a phase difference signal.

The loop filter 123 removes high-frequency components from the phase difference signal generated by the PD 322 (operation S43). The VCO 326 generates an internal clock synchronized with the phase of the external clock based on the phase difference signal input from the PD 322 via the loop filter 123 (operation S44).

The current modifier 324 determines whether or not a CR control signal has been received from the CR controller 112 (operation S45). If a CR control signal has not been received from the CR controller 112 (operation S45: No), the process returns to operation S41, and the current modifier 324 keeps the current output from the current sources 332 of the PD 322 at the current I1.

In contrast, if a CR control signal has been received from the CR controller 112 (operation S45: Yes), the current modifier 324 outputs to the current sources 332 of the PD 322 a current modification signal instructing the current sources 332 to modify the current to a current I2 that is smaller than the present current I1. Having received the current modification signal, the current sources 332 of the PD 322 modify the current I1 to the current I2 (operation S46). Once the current I1 is modified to the current I2, the PD 322 amplifies the phase difference signal with a gain that is smaller than the gain corresponding to the current I1, and outputs an amplified phase difference signal to the VCO 326 via the loop filter 123 (operation S47). The VCO 326 generates an internal clock synchronized with the phase of the external clock based on the phase difference signal amplified with a gain that is smaller than the gain corresponding to the current I1 (operation S48).

The current modifier 324 determines whether or not the output of the CR control signal from the CR controller 112 has stopped (operation S49). If the output of the CR control signal has not stopped (operation S49: No), n the processing in operations S46 to S49 are repeated. In contrast, if the output of the CR control signal from the CR controller 112 has stopped (operation S49: Yes), the current modifier 324 outputs to the current sources 332 of the PD 322 a current modification signal instructing the current sources 332 to revert the current I2 back to the current I1. Having received the current modification signal, the current sources 332 of the PD 322 revert the current I2 back to the current I1 (operation S50). The process returns to operation S41, and the current modifier 324 keeps the current output from the current sources 332 of the PD 322 at the current I1.

As described in the foregoing, an optical receiver 300 in accordance with the fourth embodiment is configured as follows. When adjusting a dispersion value in the VDM 102, fluctuations appearing in a phase difference signal are controlled by modifying the current for determining the gain of the phase difference signal to a current that is lower than the present current. For this reason, the optical receiver 300 is able to control fluctuations appearing in the phase difference signal just by conducting a simple process of modifying the current output from the current sources of an existing PD. As a result, the optical receiver 300 is able to efficiently avoid an unlocked state when adjusting the dispersion value.

The optical receiver disclosed herein may also be carried out in various other embodiments besides the foregoing embodiments. Thus, a fifth embodiment describes another embodiment of the optical receiver disclosed herein.

For example, the third embodiment described earlier illustrates an example of controlling fluctuations appearing in a phase difference signal by having the loop filter 223 use two time constants, and by modifying the time constant from a first time constant τ1 to a second time constant τ2 that is greater than the first time constant τ1. However, fluctuations appearing in a phase difference signal may also be controlled by having a loop filter use three or more time constants, and by modifying the time constants in a stepwise manner.

All examples and conditional language recited herein are intended for pedagogical purposes to aid the reader in understanding the invention and the concepts contributed by the inventor to furthering the art, and are to be construed as being without limitation to such specifically recited examples and conditions. Although the embodiments have been described in detail, it should be understood that the various changes, substitutions, and alterations could be made hereto without departing from the spirit and scope of the invention.

What is claimed is:

1. An optical receiver, comprising:
a dispersion mitigator configured to mitigate a wavelength dispersion value in an optical signal by using a set dispersion value;
a phase difference signal generator configured to generate a phase difference signal by calculating the phase difference between a first clock signal included in an optical signal mitigated by the dispersion mitigator, and a second clock signal;
a dispersion value adjuster configured to adjust the set dispersion value set in the dispersion mitigator;
a controller configured to control fluctuations appearing in a phase difference signal generated by the phase difference signal generator when the dispersion value is adjusted by the dispersion value adjuster; and
a clock generator configured to generate the second clock signal that followed up the phase of the first clock signal, being based on the phase difference signal controlled by the controller.

2. The optical receiver according to claim 1, wherein
the controller controls fluctuations appearing in the phase difference signal by holding the voltage of a phase difference signal generated by the phase difference signal generator, and supplying the voltage-held phase difference signal to the clock generator.

3. The optical receiver according to claim 1, further comprising:
a filter configured to remove high-frequency components in a phase difference signal generated by the phase difference signal generator by using a first time constant or a second time constant that is greater than the first time constant;
wherein
the controller controls fluctuations appearing in the phase difference signal by modifying the first time constant used by the filter to the second time constant.

4. The optical receiver according to claim 1, wherein
the phase difference signal generator includes one or more current sources that produce current to determine the gain of the phase difference signal, and
the controller controls fluctuations appearing in the phase difference signal by modifying a first current output from the one or more current sources to a second current that is smaller than the first current.

5. A clock generation method conducted by an optical receiver provided with a dispersion mitigator configured to mitigate a wavelength dispersion value in an optical signal by using a set dispersion value, the method comprising:
generating a phase difference signal by calculating the phase difference between a first clock signal included in an optical signal mitigated by the dispersion mitigator, and a second signal clock;
adjusting the set dispersion value set in the dispersion mitigator;
controlling fluctuations appearing in a phase difference signal generated in the phase difference signal generating when the dispersion value is adjusted in the dispersion value adjusting; and
generating the second clock signal followed up the phase of the first clock signal, being based on the phase difference signal controlled in the controlling.

* * * * *